United States Patent
Wang et al.

(10) Patent No.: US 11,843,623 B2
(45) Date of Patent: Dec. 12, 2023

(54) APPARATUS AND METHOD FOR ANOMALY DETECTION

(71) Applicant: Mitsubishi Electric Research Laboratories, Inc., Cambridge, MA (US)

(72) Inventors: Ye Wang, Andover, MA (US); Kyeong Jin Kim, Lexington, MA (US); Xiao Wang, Allston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 276 days.

(21) Appl. No.: 17/202,438

(22) Filed: Mar. 16, 2021

(65) Prior Publication Data

US 2022/0303288 A1    Sep. 22, 2022

(51) Int. Cl.
*H04L 9/40* (2022.01)
*G06N 3/08* (2023.01)
*G06F 18/2113* (2023.01)
*G06F 18/21* (2023.01)

(52) U.S. Cl.
CPC ...... *H04L 63/1425* (2013.01); *G06F 18/2113* (2023.01); *G06F 18/2193* (2023.01); *G06N 3/08* (2013.01); *H04L 63/1433* (2013.01)

(58) Field of Classification Search
USPC .................................................. 726/22–25
See application file for complete search history.

(56) References Cited

U.S. PATENT DOCUMENTS

| | | | |
|---|---|---|---|
| 10,592,386 B2* | 3/2020 | Walters ................ | G06F 16/906 |
| 11,169,514 B2* | 11/2021 | Song ..................... | G06N 3/045 |
| 11,294,756 B1* | 4/2022 | Sadrieh ................. | G06N 3/047 |
| 11,321,066 B2* | 5/2022 | Yu ......................... | G06N 5/022 |
| 11,410,048 B2* | 8/2022 | Misu ..................... | G05D 1/0088 |
| 11,431,741 B1* | 8/2022 | Lin ....................... | H04L 63/1425 |
| 2018/0247224 A1* | 8/2018 | Garcia Duran ........ | G06N 20/00 |
| 2019/0130279 A1* | 5/2019 | Beggel .................. | G06N 5/045 |
| 2019/0199743 A1* | 6/2019 | La Marca ............. | H04L 41/145 |
| 2019/0286506 A1* | 9/2019 | Cheng .................. | G06F 11/0793 |
| 2020/0051017 A1* | 2/2020 | Dujmic ................. | G06V 30/424 |
| 2020/0195669 A1* | 6/2020 | Karasaridis ........... | H04L 63/10 |
| 2020/0285555 A1* | 9/2020 | Suh ...................... | G06F 11/3452 |
| 2020/0342329 A1* | 10/2020 | Kain ..................... | G06N 3/045 |
| 2020/0349430 A1* | 11/2020 | Schmidtler ........... | G06N 3/084 |
| 2020/0364579 A1* | 11/2020 | Misu ..................... | G06N 3/084 |

(Continued)

*Primary Examiner* — Kambiz Zand
*Assistant Examiner* — Mahabub S Ahmed
(74) *Attorney, Agent, or Firm* — Gennadiy Vinokur; Hironori Tsukamoto

(57) ABSTRACT

An anomaly detector for detecting anomaly in input data comprises an auto-encoder trained to encode the input data and decode the encoded input data to reconstruct the input data. Further, the anomaly detector comprises a classifier trained to determine a reconstruction loss indicative of a difference between the accepted input data and the reconstructed input data, where the reconstruction loss includes a weighted combination of a plurality of loss functions evaluating reconstruction losses of a plurality of parts of the reconstructed input data, different types of loss functions, or both. The classifier is further configured to detect an anomaly in the reconstructed input data when the reconstruction loss is above a threshold.

18 Claims, 9 Drawing Sheets

(56) References Cited

U.S. PATENT DOCUMENTS

| | | | |
|---|---|---|---|
| 2020/0389469 A1* | 12/2020 | Litichever | H04W 4/40 |
| 2021/0034918 A1* | 2/2021 | Schaefer | G06V 10/454 |
| 2021/0099474 A1* | 4/2021 | Huang | G06N 3/088 |
| 2021/0110262 A1* | 4/2021 | Schmitt | G06N 3/08 |
| 2021/0160257 A1* | 5/2021 | Elyashiv | G06N 3/088 |
| 2021/0174171 A1* | 6/2021 | Pi | H04B 7/18582 |
| 2021/0216627 A1* | 7/2021 | Grunwald | G06F 12/0246 |
| 2021/0232915 A1* | 7/2021 | Dalli | G06F 18/2113 |
| 2021/0319302 A1* | 10/2021 | Li | G06N 3/045 |
| 2021/0326661 A1* | 10/2021 | Munoz Delgado | G06F 18/2113 |
| 2021/0326728 A1* | 10/2021 | Kawachi | G06N 3/047 |
| 2021/0329029 A1* | 10/2021 | Vasseur | H04L 41/16 |
| 2021/0406642 A1* | 12/2021 | Chorakhalikar | A63F 13/70 |
| 2022/0012591 A1* | 1/2022 | Dalli | G06N 3/082 |
| 2022/0046114 A1* | 2/2022 | Entelis | H04L 12/40 |
| 2022/0053010 A1* | 2/2022 | Elyashiv | G06N 3/088 |
| 2022/0070195 A1* | 3/2022 | Sern | H04L 63/1408 |
| 2022/0076053 A1* | 3/2022 | Gulsun | G06V 10/751 |
| 2022/0129712 A1* | 4/2022 | Sallee | G06N 3/04 |
| 2022/0155263 A1* | 5/2022 | Inoue | G01N 29/14 |
| 2022/0156521 A1* | 5/2022 | Sohn | G06F 18/2155 |
| 2022/0156578 A1* | 5/2022 | Allahdadian | G06F 17/18 |
| 2022/0161816 A1* | 5/2022 | Gyllenhammar | G06N 20/00 |
| 2022/0172050 A1* | 6/2022 | Dalli | G06N 5/045 |
| 2022/0180189 A1* | 6/2022 | Adrian | G06T 11/00 |
| 2022/0207326 A1* | 6/2022 | Zaker Habibabadi | G06N 3/045 |
| 2022/0207352 A1* | 6/2022 | Barr | G06F 17/18 |
| 2022/0207353 A1* | 6/2022 | Barr | G06N 3/08 |
| 2022/0207365 A1* | 6/2022 | Malfante | G06N 3/04 |
| 2022/0237468 A1* | 7/2022 | Fang | H04L 63/1408 |
| 2022/0261633 A1* | 8/2022 | Butvinik | G06N 3/08 |
| 2022/0283057 A1* | 9/2022 | Koizumi | G01H 17/00 |
| 2022/0286472 A1* | 9/2022 | Khalil | H04L 63/1425 |

\* cited by examiner

APPARATUS AND METHOD FOR ANOMALY DETECTION

TECHNICAL FIELD

This invention generally relates to anomaly detection and more specifically to an apparatus and a method of detecting anomalies using an auto-encoder.

BACKGROUND

Anomaly detection generally involves the task of detecting anomalous situations. This task is broadly applicable to various applications such as security, safety, quality control, failure monitoring, process control, etc. Across various applications, the purpose of anomaly detection is typically to raise an alarm about unusual situations that require further investigation and potentially responsive action to mitigate any deleterious issues. Due to huge information flow, manual investigation and response can be costly, so that it would be useful for an anomaly detection system to also provide information that helps to explain the reasons for detection, in order to guide investigation and appropriate response.

Conventional anomaly detectors use auto-encoders that reconstruct input data and a reconstruction loss between the input data and the reconstructed data is used to detect anomalies in the input data. One of the major problems in training the anomaly detectors is the lack of training data having the anomaly. Hence, the auto-encoders configured to detect the anomaly are currently trained based on the normal non-anomalous data. The concept of training the autoencoder on only non-anomalous data is called one-class learning, where the one-class learning models the data distribution of "normal" (non-anomalous) data samples. In this approach, the reconstruction loss of the auto-encoder acts as an indicator of whether an input data example (given at test time) is anomalous, with a higher reconstruction error indicating an anomaly since the general principle is that the auto-encoder should learn to reconstruct normal data effectively, but have a higher error for anomalous data. Hence, thresholding the error works as an anomaly detector.

However, the one-class classifier for anomaly detection may fail to properly handle the rich context of real-world practical applications, wherein the input data used for anomaly detection includes multiple and possible heterogeneous features. Accordingly, there is a need for an anomaly detector that analyzes each feature of the input data, individually, to detect an anomaly and/or provides information explaining the reason for the detected anomaly.

SUMMARY

Some embodiments are based on the realization that it is difficult to obtain labeled anomalous data in order to train an anomaly detector to detect anomalies. Therefore, an unsupervised anomaly detection method that comprises training the anomaly detector using normal data is used. When anomalous data is inputted to the anomaly detector, which has been trained using the normal or benign data, it can then detect the anomalous data. Such training is referred to herein as a one-class classifier.

However, the input data comprises multiple features. The one-class classifier train for anomaly detection fails to analyze each feature of the input data, individually. Thus, even when the current anomaly detectors detect an anomaly, they fail to provide information about which feature of the input data is determined to be anomalous. Such information may be very useful to guide the investigation of the detected anomaly. For example, some embodiments are based on the realization that different features of the input data may contribute to anomalies differently. Analyzing different features separately, but jointly can improve the accuracy of anomaly detection.

Additionally or alternatively, some embodiments are based on the realization that sometimes the anomalous training data is available but not in the quantities sufficient to train a multi-class classifier. Some embodiments are based on the recognition that a one-class classifier is still preferable over multi-class classifiers when some classes are undertrained. Hence, the insufficient amount of anomalous training data is ignored for the training of a one-class classifier, which is a shame.

To address this issue, some embodiments instead of using the available anomalous training data for training the multi-class classifier, use the anomalous training data for tuning a threshold of anomaly detection of the one-class classifier. These embodiments alone or in a combination with compound loss function can improve the accuracy of anomaly detection without increasing the complexity of its training.

For example, some embodiments perform anomaly detection on structured sequential data, where the data samples contain a mixture of different types of features. Some features are categorical, some are words from a large vocabulary, and some are numerical. Processing the sequential data requires combining different types of values corresponding to the different types of features in order to detect anomalies. These varied data types arise in sequential data, such as, internet proxy logs, where some fields are categorical (commands, protocols, error codes, etc.), some are words (domain names, URL paths, filenames, etc.), and others are numerical (data sizes, character statistics, timing, etc.).

Some embodiments use the anomaly detector trained using a one-class label model to perform anomaly detection in internet proxy log data to detect cyber attacks to cyber-physical systems and other malicious activity in a computer network. The goal for the anomaly detector is to help automate the detection and response to cyberattacks and further, to provide an explanation for why the data appeared anomalous, in order to guide investigation and appropriate response. The raw internet traffic logs data comprises log entries of internet traffic requests from many different users, with these different data streams inherently interleaved in the log data recording. Thus, the proposed anomaly detector first de-interleave sequences of log entries generated by different users and then handle each user's sequence independently. The alternative of simply processing all of the sequences while interleaved may overburden the training of the autoencoder with additional unnecessary complexity.

Some embodiments are based on the recognition that the internet proxy log data comprises data samples that have a heterogeneous mixture of different features. Some of the features naturally appear in the data (the proxy log entries contain numerical, categorical, and text fields). The internet proxy log data is a type of sequential data. In the sequential data, within each sequence, the data is structured as a mixture of different types of features. Some features are categorical, some are words from a large vocabulary, and some are numerical. In particular, for the sequential data corresponding to the internet traffic logs, a key raw feature is the HTTP command and URL accessed. The HTTP command is an example of a categorical feature that comes from a limited set of possibilities (e.g., GET, POST, HEAD, etc.). However, an URL is composed of many different parts, including the protocol (e.g., most commonly "http", "https", or "ftp"), domain name, and top-level domain(s), but also potentially subdomain(s), path, filename, file extension, and parameter(s). While the protocol and top-level domain(s) are categorical variables, the rest of the parts of the URL are general words and symbols that can come from a very large vocabulary. Thus, in order to handle the URL feature, in some embodiments the URL is decomposed as: treating the protocol and top-level domain(s) as categorical features, treating the domain name and sub-domain as words from a large vocabulary, and computing numerical statistics on the path and parameters.

In order to handle the domain and sub-domain words, forming a vocabulary of the most commonly seen words from the training data is used. Words outside of the most common set may be labeled as an "other" group. However, the necessary vocabulary can still be very large making it difficult to handle the size of the vocabulary. Thus, to handle the size of the vocabulary during training, a word embedding module may be used, where the word embedding module may be pre-trained for each feature of multiple features present in the URL, to convert each word to a smaller dimensional feature vector rather than to use a very large one-hot categorical encoding. Thus, these embedding vectors (i.e. feature vectors) are used in place of original domain/sub-domain words as processed features for the auto-encoder to work with.

In some embodiments, for other categorical features with a manageable number of categories, the set of categories may be reduced to only those most commonly seen during training and labeling the rest as an "other" category.

In some embodiments, the anomaly detector decomposes each sequence of inputted sequential data into multiple fields based on multiple features of the sequential data. Further, data corresponding to each feature comprised in each field is vectorized and concatenated, and provided to the auto-encoder. The auto-encoder is trained to compress and reconstruct the concatenated data. An overall reconstruction loss for the auto-encoder training is calculated by combining individual losses for each individual feature. For the embedded word features, a loss is measured in the form of mean squared error or mean absolute error of the word embedding feature vectors. For the categorical features, a loss is measured by the cross-entropy loss. For numerical features, a loss is measured by the mean squared error or mean absolute error of the numerical values. These individual loss terms are all combined as a weighted average to form the overall reconstruction loss.

In some embodiments, to cover different types of structured sequential data, the anomaly detector comprises a flexible structure that provides a feature selection out of: categorical features that require embedding, categorical features that require one-hot encoding, or numerical features. Accordingly, the flexible structure provides a loss function selection mechanism that adaptively selects a set of best loss functions for the chosen features.

Some embodiments are based on the realization that detecting the anomaly from the heterogenous mixture of data features is a challenging task. The general approach of the anomaly detector for detecting an anomaly could also be applied to other forms of data with a heterogeneous mixture of features. For example, in computer vision tasks, the different color channels of an image may provide different levels of information. Further, the image could be preprocessed with a variety of tools, like object detection, skeleton tracking, etc., that could yield different features in addition to the raw pixel values. In audiovisual data, the sound is another heterogeneous feature that is part of the mixture. Video data may also have preprocessed motion vectors in addition to the raw images. Physiological data may also include heterogeneous features if, for example, gathered from a variety of sensor modalities.

The heterogeneous mixture of features can be handled with the autoencoder that jointly encodes and decodes all the features, and the overall reconstruction loss is formulated as a weighted sum of individual loss terms for each feature, where each loss term is something specific to and appropriate for that feature (e.g., for internet proxy data: mean-squared error for numerical features, cross-entropy for categorical, etc.). Weights are applied to the loss-terms because the loss terms may be at different scales, but these weights are also useful to emphasize the more important features and deemphasize the less important ones. However, it is difficult to know which features are most important for distinguishing unknown types of anomalies given training that data only contains normal samples. Thus, there arises a challenge of determining and best utilizing the most important features.

After training, the auto-encoder can be applied to detect anomalies in new data examples by determining the overall reconstruction loss and comparing against a tunable threshold. Further, in order to obtain a degree of explainability in the anomaly detection, the individual loss terms can be examined to discover which feature(s) in particular contribute most to the loss. This would highlight the feature(s) that were most difficult to compress and reconstruct, which suggests that they may be the root of what makes the particular data example anomalous. Thus, this type of information could potentially flag the most anomalous features of interest to follow-up investigators.

Thus, the autoencoder is first trained offline, using unsupervised training, and then the autoencoder is further tuned online with a limited amount of labeled data (supervised learning) generated by a user that provides feedback at test time. Instead of keeping static loss-term weights in the computation of the overall reconstruction loss and a fixed threshold for declaring an anomaly, these weights and the threshold can be tuned in a supervised manner based on the feedback from the user.

Further, while providing anomaly detection results to the user, the feedback may be provided by the user, where the feedback indicates false alarms and missed detections to the anomaly detector, which provides labels for a small set of informative data examples. With this small set of labeled data flagged by the user, the anomaly detector may retune the loss-term weights to improve detection performance.

To that end, the reconstruction loss is treated as a score calculated as a function of individual loss-terms and the weights, corresponding to each feature of multiple features of inputted data. With true labels, indicated by the user, for the small set of examples, the weights are adjusted toward improving the detection performance based on the labeled small set of examples. This can be achieved in an online fashion, with only small adjustments done incrementally for each labeled example, as limited feedback from the user is obtained during operation. In an example embodiment, the adjustment can specifically be realized with a gradient descent step on weights for binary classification cross-entropy loss between true labels (provided by user feedback) and classification scores that are computed from the reconstruction loss and threshold.

Further, in the feedback, the user can also indicate roughly where the user wishes to operate on the false alarm vs missed detection tradeoff curve (i.e., the user can indicate whether the user wishes to have a better detection rate at the cost of more false alarms, or the user wishes to have fewer alarms at the cost of more missed detections). Accordingly, the threshold for comparing the overall reconstruction loss to detect anomaly is increased/decreased in response to the user's feedback. However, in order to make a calibrated adjustment of the threshold to achieve a specific tradeoff point indicated by the user, the small set of labeled examples generated by the user feedback can be used to tune the threshold such that the anomaly detector performs at the desired false alarm vs missed detection tradeoff.

Accordingly, one of the embodiments discloses an anomaly detector that comprises an input interface configured to accept input data, at least one processor, and memory having instructions stored thereon that form modules of the anomaly detector, where the at least one processor is configured to execute the instructions of the modules of the anomaly detector. The modules comprises: an autoencoder including an encoder trained to encode the input data and a decoder trained to decode the encoded input data to reconstruct the input data. The modules further comprises a classifier trained to determine a reconstruction loss indicative of a difference between the accepted input data and the reconstructed input data, where the reconstruction loss includes a weighted combination of a plurality of loss functions evaluating reconstruction losses of a plurality of parts of the reconstructed input data, different types of loss functions, or both. The classifier module is further configured to detect an anomaly in the reconstructed input data when the reconstruction loss is above a threshold. The anomaly detector further comprises an output interface configured to render a result of the anomaly detection.

Accordingly, one of the embodiments discloses a method for detecting an anomaly. The method comprising: receiving input data; encoding the input data; decoding the encoded input data to reconstruct the input data. The method further comprising: determining a reconstruction loss indicative of a difference between the accepted input data and the reconstructed input data, where the reconstruction loss includes a weighted combination of a plurality of loss functions evaluating reconstruction losses of a plurality of parts of the reconstructed input data, different types of loss functions, or both; detecting an anomaly in the reconstructed input data when the reconstruction loss is above a threshold; and rendering a result of the anomaly detection.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

The present disclosure proposes an anomaly detector to detect anomaly in sequential data such as image data, video data, internet proxy data, and the likes that comprise mixture of heterogeneous features. However, one of the challenges in detecting anomaly is lack of labelled anomalous data that can be used for training the anomaly detector. In order to overcome the challenge, the proposed anomaly detector uses a neural network based auto-encoder. The auto-encoder, at a high level, maps input data to itself (i.e., the input data) through a latent space representation of the input data. To that end, the auto-encoder encodes the input data into a latent space. Further, the auto-encoder decodes the encoded input data from the same latent space. A reconstruction loss between input data to the auto-encoder (or the encoder) and the reconstructed data is estimated. The anomaly detector may be trained based on the reconstruction loss to detect anomaly in the input data. Thus, the proposed anomaly detector can be trained without labeled data (i.e., the anomaly detector is trained using the reconstruction loss). A detail description regarding the proposed anomaly detector is provided below with respect to FIG. 1.

Figure 1:
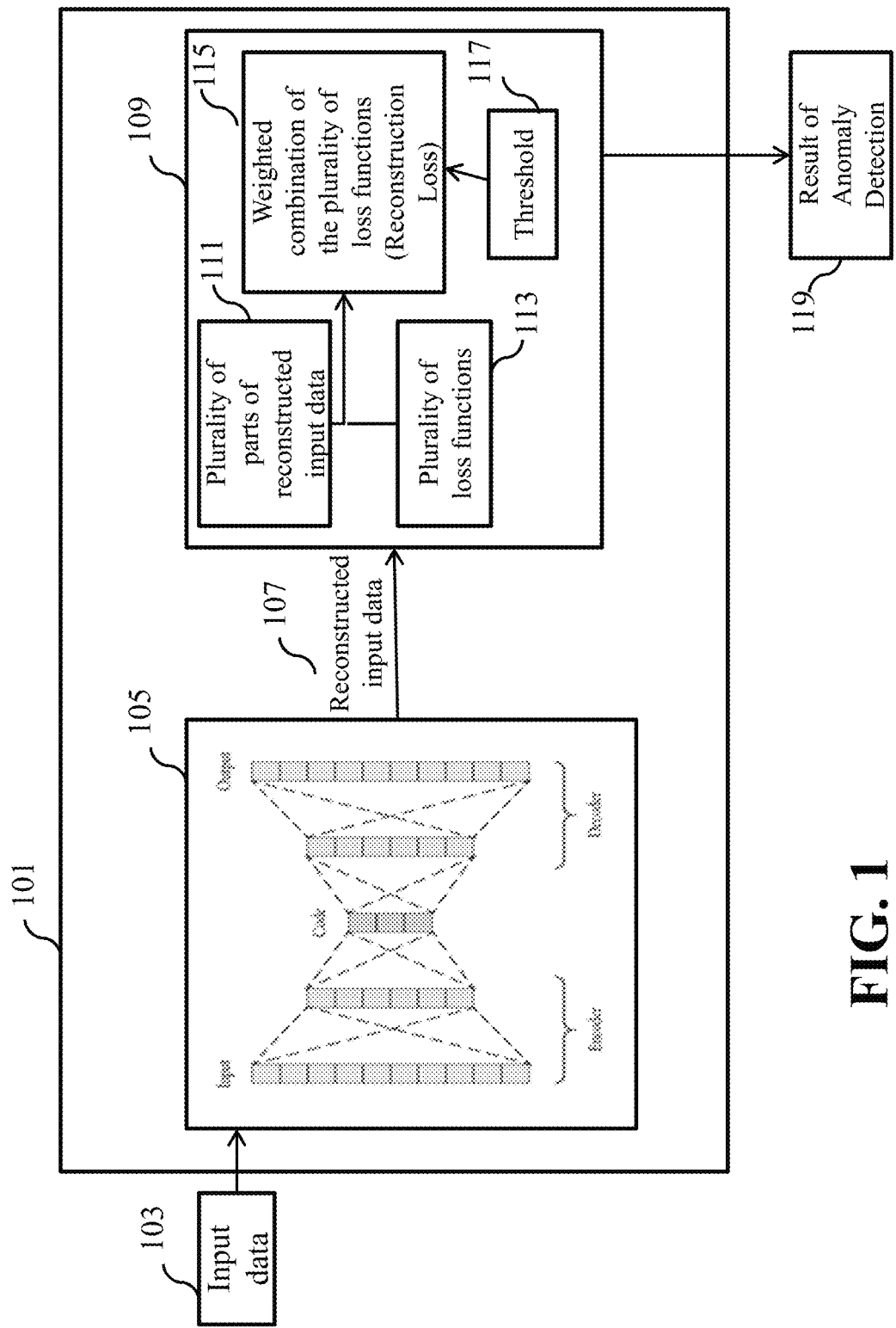
FIG. 1 illustrates an anomaly detector for anomaly detection from input data, in accordance with an example embodiment.

FIG. 1 illustrates an anomaly detector 101 for anomaly detection from input data 103, in accordance with an example embodiment. The anomaly detector 101 may include an input interface (not shown) to obtain the input data 103. The input data 103 may correspond to sequential data that comprises mixture of heterogeneous features. The sequential data may include text data (such as internet proxy log data), image data, video data, audio data, protein sequences, or the likes. In some embodiments, the input data 103 may comprise multiple features such as categorical features, numerical features, or the likes.

The anomaly detector 101 may include an auto-encoder 105, where auto-encoder 105 is a pair of neural networks: an encoder neural network and a decoder neural network. The input data 103 is provided to an auto-encoder 105. The auto-encoder 105 converts samples of the input data 103 into a reduced dimensionality (compressed) representation, and the decoder uses these representations to reconstruct original data samples of the input data 103. The reconstructed input data 107 comprises some reconstruction loss 115), where the reconstruction loss 115 corresponds to the difference between the original input data 103 and reconstructed input data 107. The anomaly detector 101 determines anomaly in the input data 103 based on computation of the reconstruction loss 115.

To that end, the auto-encoder 105 is trained on normal data samples (or benign data samples) associated with a type of the input data 103, where the auto-encoder 105 is trained to encode the input data 103 and the decoder is trained to decode the encoded input data to reconstruct the input data 103 (i.e., the reconstructed input data 107).

The anomaly detector 101 may include a classifier module 109 (also referred as "classifier 109"). The reconstructed input data 107 is provided to the classifier 109, where the classifier 109 is configured to determine the reconstruction loss 115 associated with the reconstructed input data 107. In order to determine the reconstruction loss 115, the classifier module 109 initially determines a plurality of parts 111 of the reconstructed input data 107. In particular, the plurality of parts 111 is determined based on a plurality of features of the reconstructed input data 107. Each part of the plurality of parts 111 comprises reconstructed data corresponding to each feature of the plurality of features. The plurality of features may be inherited by the reconstructed input data 107 from original accepted input data (the input data 103). For example, in a text data the plurality of features comprises categorical features, numerical features, or the likes.

The classifier module 109 is further configured to determine a plurality of loss functions 113 for each part of the plurality of parts 111 of the reconstructed input data 107. Each loss function of the plurality of loss functions 113 accurately measures individual loss (or individual reconstruction loss) associated with each part of the plurality of parts 111 of the reconstructed input data 107. In some embodiments, each loss function of the plurality of loss functions is selected based on a type of a feature comprised in each part of the plurality of parts 111. For example, the classifier module 109 may determine cross-entropy loss function to determine loss corresponding to a part of the reconstructed input data associated with categorical feature. Similarly, a mean squared error (MSE) loss function may be used to determine loss corresponding to a part of the reconstructed input data 107 associated with numerical feature.

Further, the classifier 109 is configured to determine the reconstruction loss 115 as a weighted combination of the plurality of loss functions 113. To that end, the classifier module 109 may determine plurality of weights used to weight each loss term of the plurality of loss terms/functions 113. The plurality of weights may be used to emphasize important features and deemphasize less important feature of the reconstructed input data 107 to determine the anomaly from the reconstructed input data 107.

In order to detect the anomaly, the classifier module 109 is further configured to compare the reconstruction loss 115 (or overall reconstruction loss) with a threshold reconstruction loss 117 (also called as "threshold 117"). In some embodiments, the threshold 117 may be determined based on reconstruction losses between a plurality of normal data samples (or benign data samples) of the original input data 103 and a plurality of reconstructed data samples corresponding to the normal samples of the input data 103.

When the determined reconstruction loss 115 is higher than the threshold 117, the classifier 109 determines that a particular input sample comprises anomaly which may be a threat to a user. The classifier 109 may further notify the user regarding the detected anomaly. On the other hand, when the determined reconstruction loss 115 is less than the threshold 117, the classifier 109 determines that a particular input sample as benign data sample. In this way, the proposed anomaly detector 101 uses the reconstruction loss 115, which is the weighted combination of the plurality of loss functions 113, to determine a result of anomaly detection 119 in the input data 103.

In some embodiments, a value of the threshold 117 is tunable. To that end, feedback is obtained from a user in real-time or offline. Also, the user feedback is used to adjust weights associated with each loss function of the plurality of loss functions 113. A detailed explanation of tuning the threshold 117 and weights of the loss function based on the user feedback is described further with respect to FIG. 2.

Figure 2:
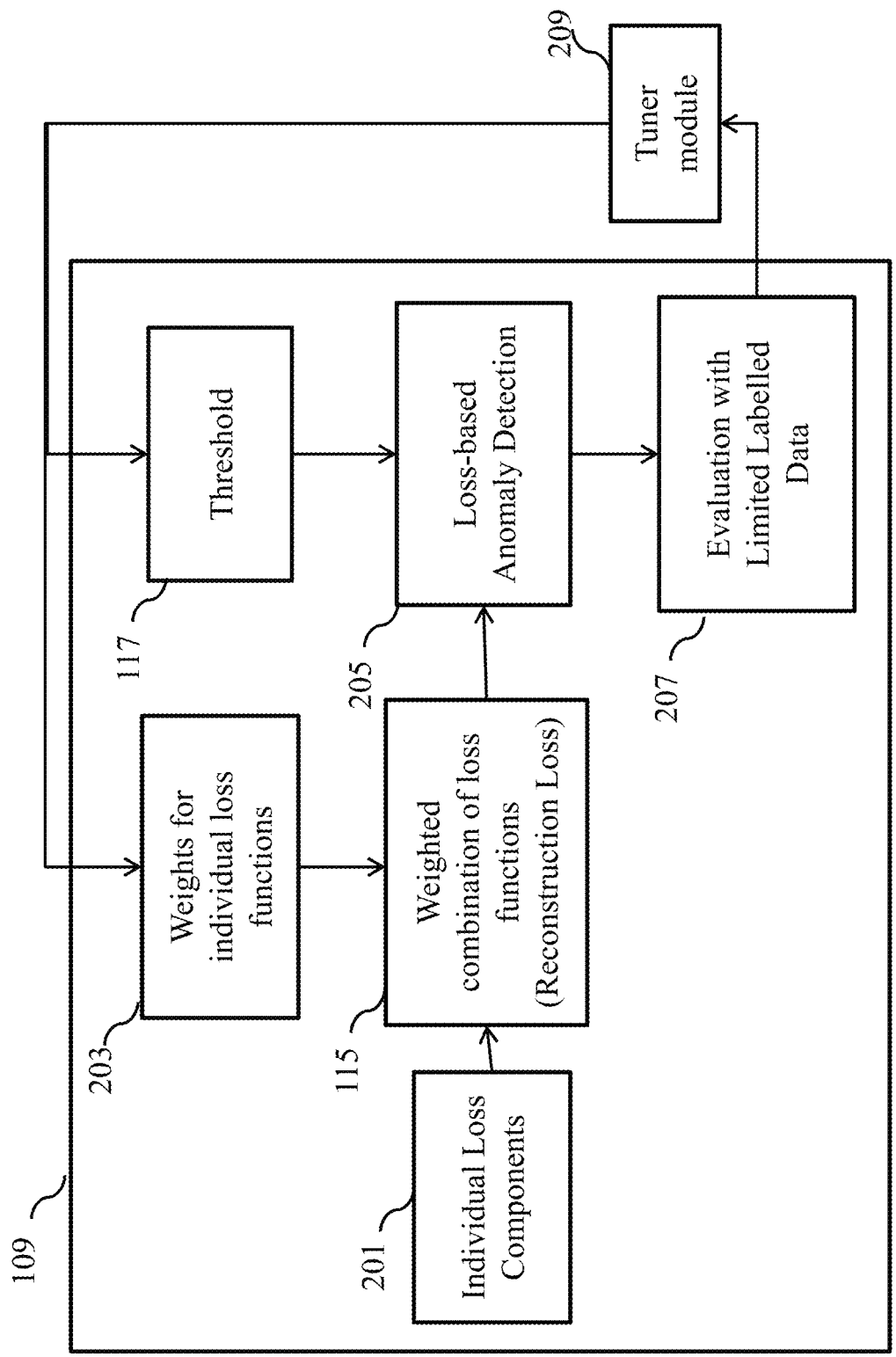
FIG. 2 illustrates functional diagram of tuning process in the anomaly detector, in accordance with an example embodiment.

FIG. 2 illustrates a functional diagram of a tuning process in the anomaly detector 101, in accordance with an example embodiment. FIG. 2 is described in conjunction with FIG. 1.

In some embodiments, the anomaly detector 101 may include a tuner module 209. The tuner module 209 is used along with the classifier module 109. Initially, the classifier module 109 determines individual loss components 201 corresponding to each part of the plurality of parts 111, where the individual loss components 201 may comprises MSE loss, cross-entropy loss, or the likes. Further, weights 203 for individual loss function may be determined and accordingly, the reconstruction loss 115 may be determined as a weighted sum of loss terms. The classifier 109 further uses loss-based anomaly detection 205, where the reconstruction loss 115 computed by the classifier 109 is compared with the threshold 117 to detect the anomaly and accordingly, render the result of anomaly detection 119.

Based on the result of anomaly detection 119, the user may provide feedback (also called as "user feedback") to the anomaly detector 101 in case of discrepancy. For example, it is possible that the input data 103 classified as non-anomalous data by the classifier module 109 may be anomalous. When the user determines such discrepancy, the user may provide the feedback, wherein in the feedback the user provides a label (in this case non-anomalous) for the misclassified input data 103.

Based on the feedback, the tuner module 209 may update at least one of: the threshold 117 and weights 203 of at least one (i.e., individual) loss function of the plurality of loss functions 113 in the weighted combination of the loss functions to adjust the reconstruction loss 115 such that the result of the anomaly detection 119 is aligned with the label provided by the user. The weights 203 may be adjusted automatically during training of the anomaly detector 101 or during execution (i.e., based on the user feedback that is received online).

In another embodiment, based on the result of the anomaly detection 119, the user may determine misclassifications of the input data as anomalous (or non-anomalous). The user may update the anomaly detector 101 regarding the misclassification through the feedback, where the feedback may comprise one or more labels indicating misclassification of the input data 103. For example, if non-anomalous data is identified as anomalous by the anomaly detector 101, the user may provide label "No" to indicate misclassification of the input data 103. Accordingly, the tuner module 209, based on the feedback, may update at least one of: the threshold 117 and weights 203 of at least one (or individual) loss function of the plurality of loss functions 113 in the weighted combination of the loss functions to correct the misclassification.

In some embodiment, the anomaly detector 101 may determine amount of data misclassified, based on the feedback provided by the user. Further, if the amount of data misclassified is more than a specific threshold, then threshold reconstruction loss 117 may be updated.

In another embodiment, the threshold 117 may be adjusted by the user based on observation of the result of anomaly detection 119. The user can confirm whether the result of anomaly detection 119 is an anomaly or a false alarm. The anomaly detector 101 allows the user to provide the feedback via a user interface (not shown). By adjusting the threshold 117 the user may decide the performance tradeoff between improving the false alarm rate versus improving the anomaly detection rate. The user feedback provides a limited amount of labelled data that comprise labels for anomalous data identified by the user. The labelled data is used by the classifier module 109 for evaluation 207 of performance of the anomaly detector 101. With the limited amount of labelled data, false alarm rate and anomaly detection rate of the anomaly detector 101 may be estimated. To that end, the anomaly detector 101 may determine amount of input data 101 misclassified by the anomaly detector 101, based on the labeled data obtained from the user feedback, where the misclassified data has resulted in false alarms. Further, the anomaly detector 101 may compare amount of data misclassified to a specific threshold (e.g., the threshold 117), where based on the comparison the false alarm rate and anomaly detection rate may be determined. Based on the estimated false alarm rate and the anomaly detection rate, the threshold 117 may be adjusted automatically in order to obtain the performance trade off desired by the user (i.e., whether the user desires improved anomaly detection rate or improved false alarm detection rate).

In some embodiments, the user feedback may be obtained online (in real-time). In another embodiment, the user feedback may be obtained offline.

In some embodiments, the performance evaluation 207 with limited labeled data may use overall loss or the reconstruction loss 115 as a soft decision score for anomaly detection. The soft decision score is used to calculate a cross-entropy loss with respect to the labelled data. Since the reconstruction loss 115 is a function of the weights for the plurality of loss functions, the weights of the plurality of loss functions can be adjusted to optimize the cross-entropy loss via a method such as gradient descent. The gradient descent is an optimization algorithm for finding a local minimum of a differentiable function. The gradient descent is simply used to find the values of a function's parameters (coefficients) that minimize a cost function as much as possible.

The gradient descent allows the adjustment and fine tuning of the performance of the anomaly detector 101 using only a very limited amount of labelled data, which can include online adjustment via the user feedback. The gradient descent is particularly applicable when the labelled data may be limited in such a way that fully adjusting the entire autoencoder parameters (which is separately trained on a large amount of unlabeled data) is prohibitive.

Figure 3:
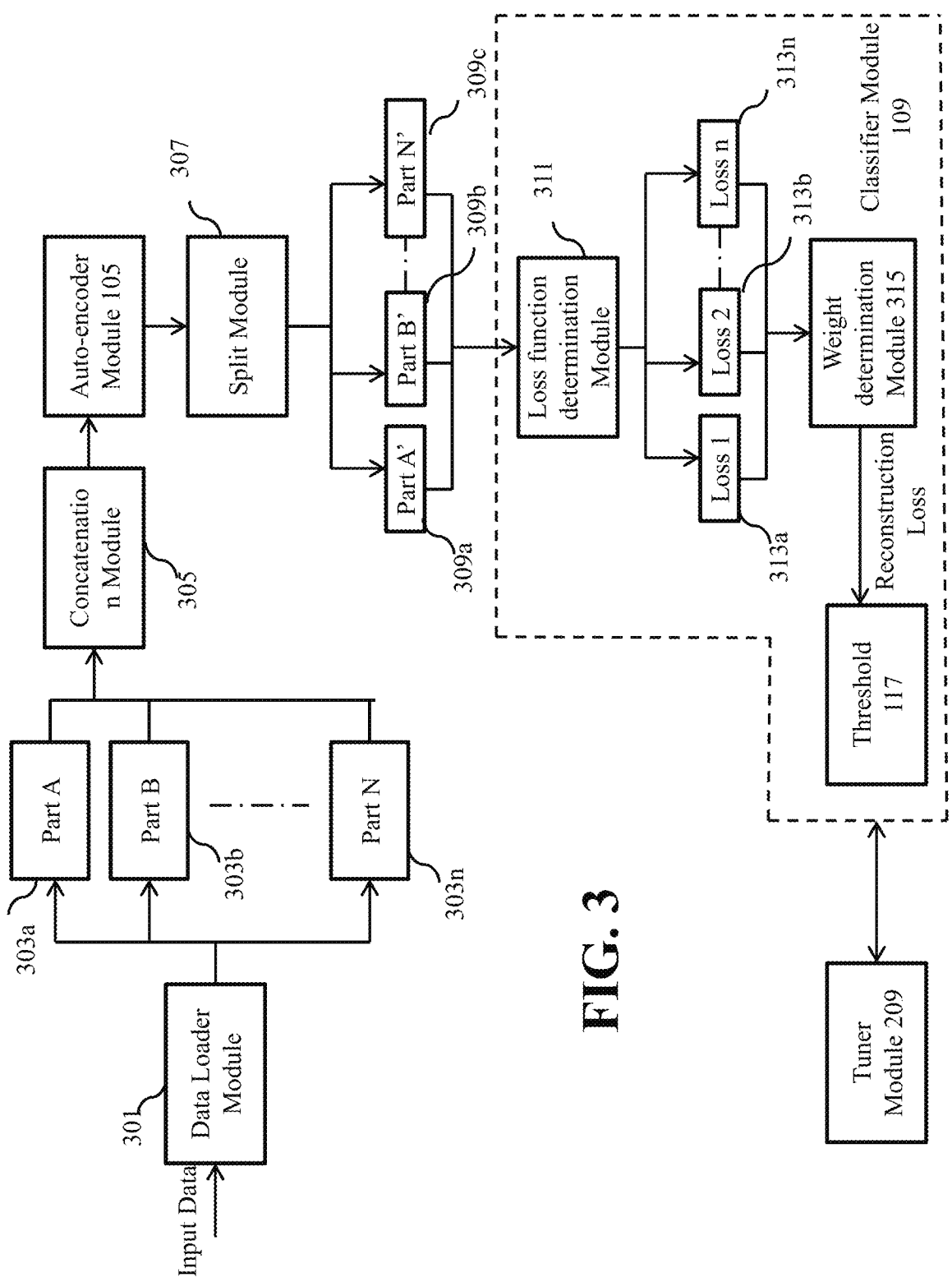
FIG. 3 is a schematic illustrating architecture of the anomaly detector, in accordance with an example embodiment.

FIG. 3 illustrates an architecture of the anomaly detector 101, in accordance with an example embodiment. The anomaly detector 101 includes an auto-encoder module 105 trained to compress input data (e.g., the input data 103) and decompress the input data to reconstruct the input data. Further, reconstruction loss between the reconstructed input data and original input data is determined to detect anomaly in the input data. Some embodiments are based on the realization that the input data comprises a plurality of features. The auto-encoder module 105 may marginalize over the plurality of features during compression and decompression of the input data. Some embodiments are based on further realization that the reconstruction loss obtained by marginalizing over all the features of the input data may not accurately detect anomaly in the input data, as due to marginalization different input features present in the input data may be treated equally. Thus, it may not be possible to notify the user which feature of the input data is detected to be associated with anomaly.

Hence, some embodiments analyze each feature of the input data individually to accurately determine the anomaly and further determine which feature of the plurality of features is associated with the anomaly.

To that end, the auto-encoder module 105 is trained using the one-class classification model. The one-class classification model comprises unsupervised learning algorithm that attempts to model "normal" examples in order to classify new examples as either normal (non-anomalous) or abnormal (anomalous). The one-class classification model can be used for binary classification tasks with a severely skewed class distribution. The model can be fit on the input examples from the majority class in the training dataset, then evaluated on a holdout test dataset.

Therefore, a training data set comprising majority class of normal data set can be used to train the auto-encoder using the one-class classification model, as the one-class classification model can be effective for imbalanced classification datasets where there are none or very few examples of the anomalous class. Further, the one-class classification model can be effectively used for datasets where there is no coherent structure to separate the classes that could be learned by a supervised algorithm. Thus, the one-class classification, or OCC for short, involves fitting a model on the "normal" (or non-anomalous) data and predicting whether new data is normal (i.e., non-anomalous) or an outlier/anomaly (or anomalous).

After training, the auto-encoder module 105 can be applied to detect anomalies in new data examples by determining the overall reconstruction loss 115 and comparing against a tunable threshold (or the threshold 117). Further, in order to obtain a degree of explainability associated with the detected anomaly in the anomaly detection, individual loss terms of the plurality of loss terms 113 can be examined to discover which feature(s) of plurality of features of input data in particular contributes most to the reconstruction loss 115. This highlights the feature(s) that were most difficult to compress and reconstruct, which suggests that they may be root of what makes a particular data anomalous. Thus, this type of information could potentially flag the most anomalous features of interest to follow-up investigators.

To that end, a data loader module 301 of the anomaly detector 101 accepts the input data and partitions the input data into a plurality of parts based on the plurality of features present in the input data. Each part of the plurality of parts comprises the input data corresponding to each feature of the plurality of features. The data loader module 301 is further configured to process input data corresponding to each feature and to produce a fixed dimensionality numerical feature representation vector. Thus, the data loader module 301 vectorizes data corresponding to each feature comprised in each part and vectorizes each part to produce parts 303a, 303b ... 303n, also called as "Part A", "Part B" ... Part "N" respectively.

Further, each vectorized data is provided to a concatenation module 305 of the anomaly detector 101. The concatenation module 305 is configured to concatenate the plurality of vectorized parts to form a concatenated data. The concatenated data is further provided to the auto-encoder module 105, where the auto-encoder module 105 uses an encoder to encode the concatenated data into a latent space representation. The auto-encoder module 105 further uses a decoder to reconstruct the input data from the latent space representation of the concatenated data.

Further, the reconstructed data generated by the auto-encoder module 105 is provided to a split module 307 of the anomaly detector 101. The split module 307 is configured to split the reconstructed data, into the plurality of parts 309a, 309b ... 309n, also called as "Part A", "Part B" ... "Part N" respectively, based on the plurality of features present in the reconstructed data. Thus, each part of the plurality of parts comprises data corresponding to each feature of the plurality of features. Splitting the reconstructed data into the plurality of parts based on the plurality of features enables the anomaly detector 101 to analyze each feature of the input data that are inherited by the reconstructed data separately.

Further, the plurality of parts 309a, 309b ... 309n of the reconstructed data is provided to the classifier module 109. The classifier module 109 comprises a loss-function determination module 311, where the loss-function determination module 311 is configured to determine a plurality of loss functions 313a, 313b ... 313n also called as "Loss 1", "Loss 2", ..., "Loss n". Each loss function accurately computes reconstruction loss of each corresponding part of the plurality of parts 309a, 309b, ..., 309n. Further, individual reconstruction loss corresponding to each part of the reconstructed input data is computed based on the reconstructed input data.

To determine overall reconstruction loss 115, the classifier module 109 further comprises a weight determination module 315. The weight determination module 315 is configured to determine a weight for each loss function of the plurality of loss functions 113. In some embodiments, the user may select one or more features of the plurality of features as more important than the remaining features of the plurality of features. In this case, the weight determination module 315 provides higher weights to some loss functions, of the loss functions 313a, 313b, ..., 313n, corresponding to selected important features and lower weights to remaining loss functions of the loss functions 313a, 313b, ..., 313n. Further, the reconstruction loss 115 is determined by computing a weighted combination of the loss functions 313a, 313b, ..., 313n. The reconstruction loss 115 corresponds to difference between the data inputted to the auto-encoder module 105 and the data reconstructed by the auto-encoder module 105. The reconstruction loss 115 is compared with a threshold 117 to detect anomaly in the input data provided to the anomaly detector 101. The input data is detected to comprise anomaly when reconstruction loss 115 is more than the threshold 117.

When an anomaly is detected, the anomaly detector 101 using the trained auto-encoder module 105 can provide information about which feature of the input data is determined to be anomalous that allows the user to further investigate the anomaly in the input data.

Especially, based on the result of anomaly detection, the anomaly detector 101 is configured to obtain user feedback either online (i.e., in real-time) or offline. The user feedback provides at least one label indicating misclassification of the input data. Based on the user feedback, the anomaly detector 101 uses the tuner module 209 configured to adjust or tune at least one of the thresholds 117 and weights 203 assigned to each loss function of the plurality of loss functions in the weighted combination 115 of the loss functions (315a-315n) such that the result of the anomaly detection is in line with the feedback provided by the user.

Figure 4:
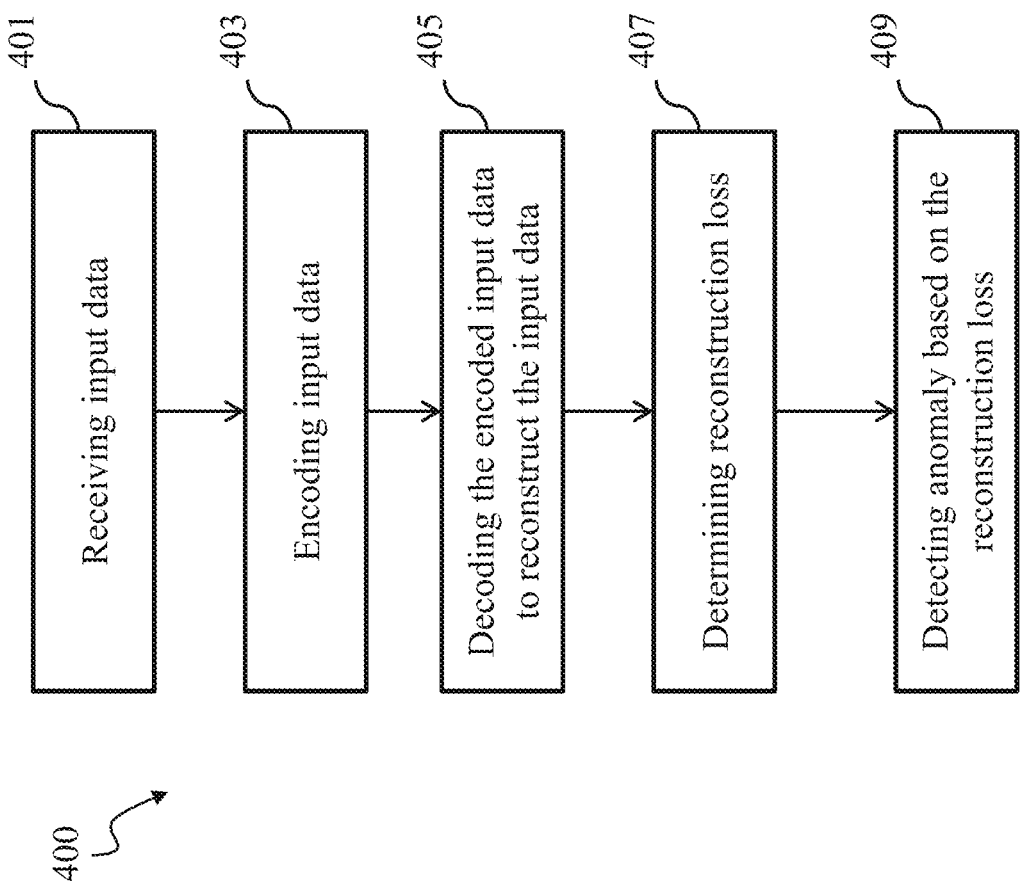
FIG. 4 illustrates steps of a method for detecting anomaly, in accordance with an example embodiment.

FIG. 4 illustrates steps of a method 400 for detecting anomaly, in accordance with an example embodiment. The method 400 starts at step 401, where input data (e.g., the input data 103) in which anomaly is to be detected may be received by an anomaly detector (e.g., the anomaly detector 101). The input data may correspond to sequential data that comprises mixture of heterogeneous features. The sequential data may include text data (such as internet proxy log data), image data, video data, audio data, protein sequences, or the likes. In some embodiments, the input data may comprise multiple features such as categorical features, numerical features, or the likes.

Further, at step 403 the input data may be provided to an auto-encoder module (e.g., auto-encoder 105) of the anomaly detector, where the input data may be encoded by an encoder neural network comprised by the auto-encoder module. The input data may be compressed by the encoder and further encoded into a latent space representation.

At step 405, the encoded input data may be reconstructed using a decoder neural network of the auto-encoder module. The decoder may use the latent space representation of the input data to reconstruct the input data. The reconstructed input data comprises some reconstruction loss, where the reconstruction loss corresponds to difference between the original input data and reconstructed input data.

At step 407, the reconstruction loss between the input data provided to the encoder and reconstructed input data, provided by the decoder, may be determined using a classifier module (e.g., the classifier module 109). In order to determine the reconstruction loss, initially a plurality of parts of the reconstructed input data may be determined based on a plurality of features comprised by the reconstructed input data. Each part of the plurality of parts comprises reconstructed data corresponding to each feature of the plurality of features. The plurality of features may be inherited by the reconstructed input data from original accepted input data.

Further, a plurality of loss functions that accurately determines individual reconstruction loss for each part of the plurality of parts of the reconstructed input data is determined. Each loss function of the plurality of loss functions measures individual loss (or individual reconstruction loss) associated with each part of the plurality of parts of the reconstructed input data. Finally, the reconstruction loss is determined as a weighted combination of the plurality of loss functions, where plurality of weights may be used to weight each loss function of the plurality of loss functions.

At step 409, anomaly may be detected based on the reconstruction loss. To that end, the reconstruction loss may be compared with a threshold. Threshold may be determined based on reconstruction losses between a plurality of vectorized normal data samples (or benign data samples) associated with the input data to be analyzed and a plurality of reconstructed data samples corresponding to the vectorized normal samples of the input data. When the determined reconstruction loss is higher than the threshold for a particular input sample, that input sample is determined to comprise an anomaly which may be a threat to a user. The method 400 may further include notifying the user regarding the detected anomaly. On the other hand, when the determined reconstruction loss is lesser than the threshold for a particular input sample, the input sample is determined as benign input data sample.

Figure 5A:
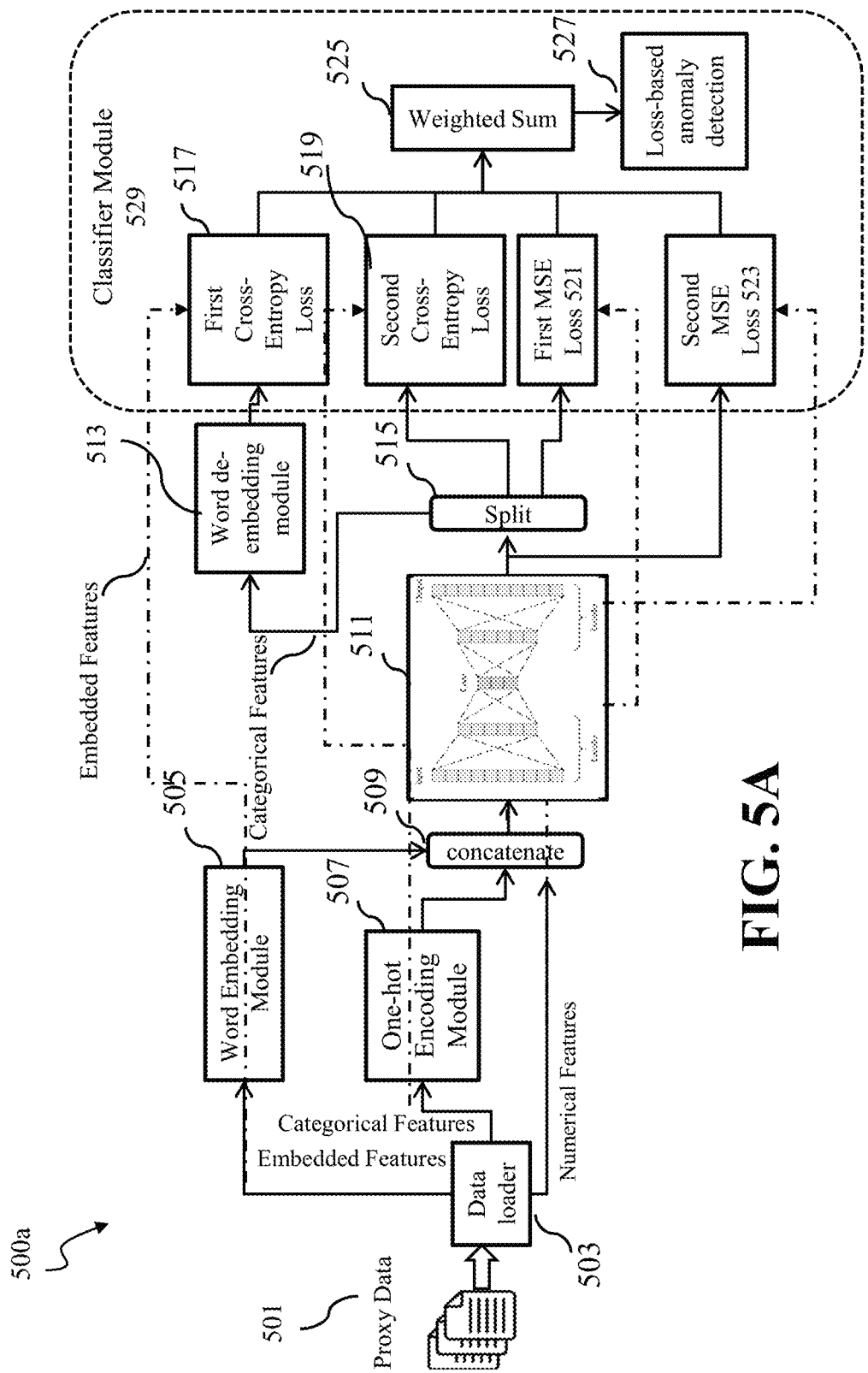
FIG. 5A is a schematic illustrating workflow of an anomaly detector for detecting anomaly in internet proxy data, in accordance with an example embodiment.

FIG. 5A is a schematic illustrating workflow of an anomaly detector 500a for detecting anomaly in internet proxy data 501, in accordance with an example embodiment. The anomaly in the internet proxy data 501 can be detected to detect to cyberattacks. The internet proxy data 501 is a sequential data that comprises a plurality of features such as categorical features, embedded features, and numerical features. The categorical features are those which have values from a discrete set of possibilities, where the size of the set is of manageable size. For example, in the internet proxy log data, examples of categorical features include HTTP response/error codes (which belong to a relatively small set), some top-level-domain categories, protocol categories, file extensions, etc. The embedded features are essentially categorical features, where the size of the set of possible values is far too large to be manageable. The set of possible words that can occur in domain names is an example of a categorical feature that would require embedding, which represents only a subset of the most common words. The numerical features are those which are inherently numerical, such as the size of a response, or character occurrence statistics extracted from text.

In order to detect anomaly in the internet proxy data 501, it is important to analyze input data corresponding to each feature of the plurality of features. To achieve this, the internet proxy data 501 may be partitioned into a plurality of parts based on the plurality of features present in the internet proxy data 501.

To that end, the anomaly detector 500a uses a data loader module 503 that accepts the internet proxy data 501 as an input and further partitions the internet proxy data 501 into the plurality of parts based on the embedded features, the categorical features, and the numerical features. In order for the anomaly detector to analyze each part in order to determine anomaly in the input data 501, each part of the input data is vectorized by the data loader module 503.

Accordingly, a part of the input data 501 corresponding to the embedded feature is provided to a word embedding module 505. The word embedding module 505 is configured to perform word embedding to produce a fixed dimensionality numerical vector representation. A word embedding is a learned representation for text where words that have the same meaning have a similar representation. In the word embedding technique, individual words are represented as real-valued vectors in a predefined vector space. Each word is represented by a real-valued vector, often tens or hundreds of dimensions. The vectorized embedded feature data is provided to a concatenation module 509.

Similarly, the part of the input data corresponding to the categorical feature is converted into a numerical vector via one-hot encoding module 507. The one-hot encoding module 507 is configured to execute one-hot encoding on data corresponding to the categorical features to transform the categorical features to numerical vector representations. The one-hot encoding module 507 performs binarization of the category features data and include the binarized features in the numerical vector. Thus, the numerical vector created using one-hot encoding comprises 0s and 1s. The vectorized categorical data is provided to the concatenation module 509.

Further, the numerical features are inherently numerical and do not require any specific handling. In some embodiments, the numerical features may be normalized before being fed into the concatenation module 509.

The concatenation module 509 combines numerical vectors corresponding to all the features to form concatenated data. The concatenated data is provided to an auto-encoder module 511, where the auto-encoder module 511 encodes and decodes the concatenated data to reconstruct the input data. The reconstructed input data comprises reconstruction loss, where the reconstruction loss is a difference between original input data and the reconstructed input data. The reconstructed input data comprises the plurality of features i.e., the embedded features, the categorical features, and the numerical features. In order to analyze data corresponding to each feature, the reconstructed input data is provided to the split module 515, where the split module 515 splits the reconstructed input data into a plurality of parts based on the plurality of features. Further, the plurality of parts is provided to a classifier module 529, where it is determined whether the input data 501 comprises anomaly or not based on the analysis of the plurality of parts of the concatenated data. The concatenated data comprise vectorized data corresponding to each feature of the input data 501. The reconstruction loss for each part of the plurality of parts reconstructed is determined using corresponding loss functions.

In order to achieve that, the data corresponding to embedded features is first de-embedded using a word de-embedding module 513. The word de-embedding module 513 is used in conjunction with the word embedding module 505. The word de-embedding module 513 is used to convert back dense representation vector space of individual words corresponding to embedded feature to a direct representation of the categorical variable, such as with a score vector that indicates unnormalized log-likelihoods of each possible categorical value. The word de-embedding module 513 may comprise a neural network comprising one or more fully-connected layers.

Further, cross-entropy losses corresponding to the embedded features and the categorical features is determined, where a first cross entropy loss 517 corresponds to the cross-entropy loss of embedded features and a second cross entropy loss 519 corresponds to the categorical features. The cross-entropy loss (loss$_{CE}$) is a loss function that is used for training classifiers to recover a discrete (categorical) label.

$$\text{loss}_{CE}(p, y) = \frac{1}{n}\sum_{i=1}^{n} -\log p_i[y_i]$$

where p=(p$_1$, p$_2$, . . . , p$_n$) denotes the tensor of estimated likelihood vectors over a batch of size n, y=(y$_1$, y$_2$, . . . , y$_n$) denotes the corresponding ground truth labels, and p$_i$[y$_i$] denotes selecting the y$_i$-th element of the likelihood vector p$_i$. Ideally, p$_i$[y$_i$] should be one, while the other elements of p$_i$ should be zero, in order to minimize the cross-entropy loss.

The first cross entropy loss 517 is determined based on the output of the word de-embedding module 513 and the original embedded features. Similarly, the second cross entropy loss 519 corresponding to the categorical features is calculated with respect to the original categorical features.

Further, for the component corresponding to the numerical features, a mean-squared error (MSE) loss is calculated with respect to the numerical features, where the MSE loss corresponding to the numerical features is denoted as a first MSE loss 521. Additionally, an MSE loss is calculated with respect to the input and output of the autoencoder module 511, where the MSE loss 521 calculated with respect to the input and the output of the autoencoder module 511 is denoted as a second MSE loss 523.

The MSE (mean-square error) loss (loss$_{MSE}$) is given by $$\text{loss}_{MSE}(x, y) = \frac{1}{d}\sum_{i=1}^{d}(x_i - y_i)^2$$

where x=($x_1$, $x_2$, ..., $x_d$) and y=($y_1$, $y_2$, ..., $y_d$) are the two vectors being compared. For example, x may be the ground truth of a vector of numerical features and y may be an estimate of that vector. In the first MSE loss 521, vector "x" may correspond to data corresponding to the original numerical feature and vector "y" may correspond to data corresponding to the reconstructed numerical feature. Similarly, in the second MSE loss 523, the vector "x" may correspond to concatenated data provided as input to the auto-encoder module 511 and vector "y" may correspond to the reconstructed input data (concatenated data) generated by the auto-encoder module 511.

In some embodiments, each part of the plurality of parts may be provided to a loss function determination module (such as loss function determination module 145) (not shown in FIG. 2A), for computing individual loss functions such as the first cross-entropy loss function 517, the second cross-entropy loss function 519, the first MSE loss function 5521, and the second MSE loss function 523.

Further, an overall reconstruction loss is determined as a weighted summation 525 of all the loss functions (i.e., weighted summation of the first cross-entropy loss function 517, the second cross-entropy loss function 519, the first MSE loss function 521, and the second MSE loss function 523). To that end, weights corresponding to each loss function may be determined using a weight determination module (such as weight determination module 315) (shown in FIG. 3). Furthermore, an anomaly is detected in the proxy data 501 using loss-based anomaly detection 527, where the reconstruction loss is compared with a threshold reconstruction loss. The proxy data 501 is determined to comprise the anomaly, when the reconstruction loss corresponding to the proxy data 501 is more than the threshold.

In an example embodiment, the anomaly detector 500a may be used with a user interface. A user may select, via the user interface, one or more features from a plurality of features of the proxy data 501 for detecting anomaly in the proxy data 501. Further, the user can also choose a plurality of loss functions to be used to determine loss corresponding to each feature and further select weights to be used for each loss function in determination of the overall reconstruction loss.

In an example embodiment, the anomaly detector 500a may be trained using one-class classification model to perform anomaly detection on internet proxy log data 501 in order to detect the cyberattacks to cyber physical systems and other malicious activity in a computer network. The anomaly detector 500a automates the detection of cyberattacks, based on the detection of the anomaly in the internet proxy data 501. Further, the anomaly detector 500a may automate responses to cyberattacks such as notifying user, where the notification may comprise a ringing alarm or notification sound, displaying the notification, or the lies. The anomaly detector 500a may further provide an explanation for why the data appeared anomalous, in order to guide investigation and appropriate response.

Figure 5B:
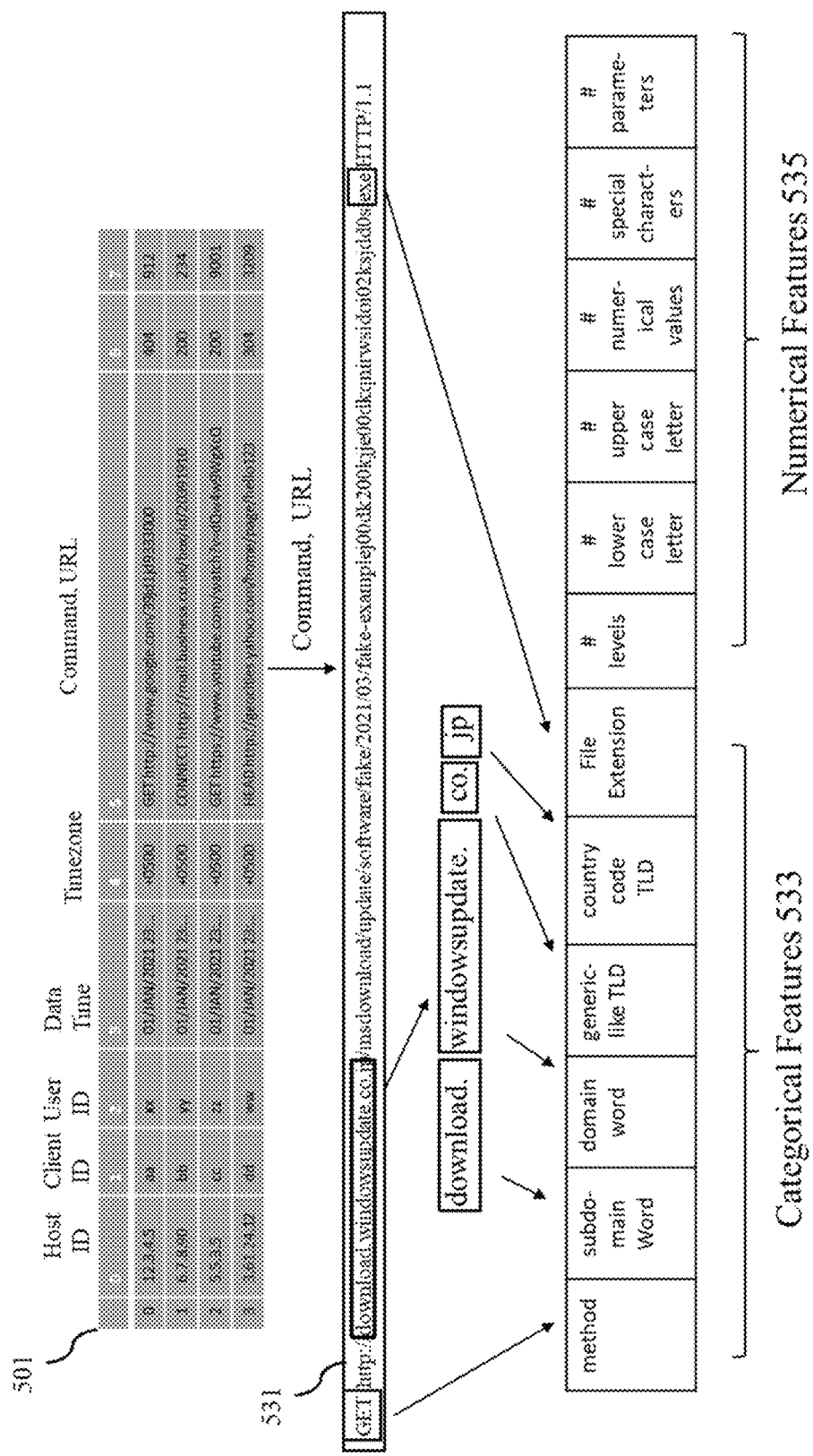
FIG. 5B illustrates decomposing data from internet proxy log into categorical features and numerical features, in accordance with as example embodiment.
Figure 5C:
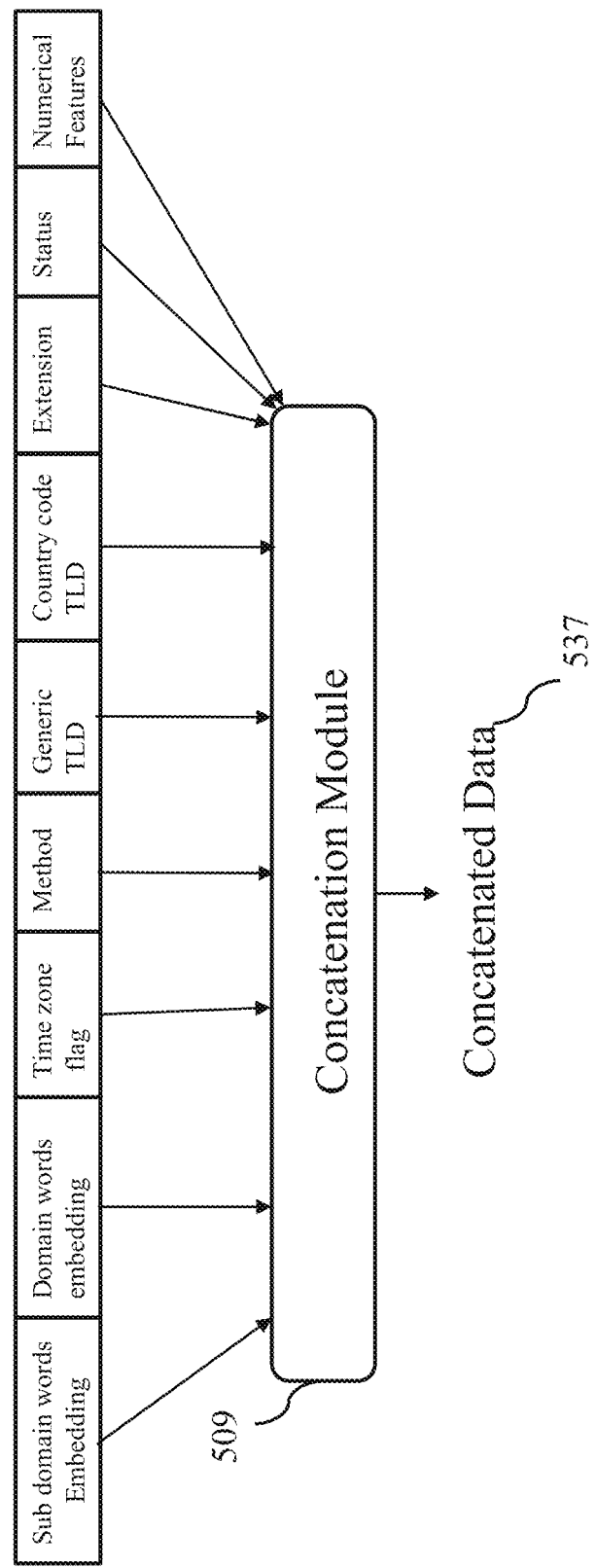
FIG. 5C illustrates the concatenation module configured to concatenate data corresponding to the plurality of features of a URL, in accordance with an example embodiment.

FIG. 5B illustrates decomposition of data from internet proxy log into categorical feature and numerical feature, in accordance with as example embodiment. FIG. 5C illustrates the concatenation module 509 configured to concatenate data corresponding to the plurality of features of a URL 531, in accordance with an example embodiment. FIG. 5B is described in conjunction with FIG. 5A. Further, FIG. 5C is described in conjunction with FIGS. 5B and 5A.

The internet proxy log (also called as the internet proxy data 501) comprises information associated with requests made by a user to a network. For example, the internet proxy data 501 comprises host id, client id, and user id of the user that has requested the network to access a specific website or web content. The internet proxy data 501 further comprises data time, time-zone, and command used by the user to access the specific website or the web content along with information about status of the command and number of bytes used by the command.

The internet proxy data 501 is a raw data that comprises sequences of log entries of internet traffic requests from many different users, where these sequences of log entries are inherently interleaved in the internet proxy data 501. Thus, in order to detect anomaly in the internet proxy data 501, the anomaly detector 500a first de-interleaves the sequences of log entries generated by different users, and then handles each user's sequence independently. Further, the alternative of simply processing all of the sequences while interleaved may overburden training of the autoencoder 511 with additional unnecessary complexity.

A URL 531 corresponding to one of the de-interleaved sequences may be obtained by the anomaly detector 500a, where the anomaly detector 500a decomposes the URL 531 into a plurality of parts based on the plurality of features comprised in the URL 531. The URL 531 comprises different information associated with the request made by the user to access the website or the web content. The information comprised by the URL 531 is decomposed into the categorical features 533 and the numerical features 535. The information decomposed into the categorical feature 533 comprises method name used by the user to access the website, in this case method name corresponds to "GET", where GET is a default HTTP method that is used to retrieve resources from a particular URL. The information comprised in the categorical features 533 further includes sub-domain words, in this case "download"; domain words, in this case "windowsupdate."; generic-like top-level domain (TLD): "co."; country code TLD: ".jp"; and file extension: ".exe". The subdomain word and domain word may be further categorized into embedded features due to the very large word vocabulary sizes.

Further, information of the URL 531 categorized into numerical features 535 comprises number (#) of levels, # of lowercase letters, # of uppercase letters, # of numerical values, # of special characters, and # of parameters. The data loader module 503 partitions the URL 531 based on the features of the URL 531. Further, the data loader module 503 vectorizes data comprised by each feature 533 and 535. Vectorizing the data converts text data (such as data comprised in domain words, sub-domains words, and the likes) into numerical vectors, where the numerical vectors are used to detect anomaly.

In FIG. 5C, the vectorized data corresponding to the categorical feature 533 and the numerical feature 535 is provided to the concatenation module 509. The concatenation module 509 concatenates vectorized data corresponding to all the features 533 and 535 and generates concatenated data 537.

In order to vectorize data (text) in the domain and sub-domain words, word-embedding module 505 is trained, where training data that comprises words form a vocabulary of the most commonly seen words is used. Words outside of the most common set may be labeled as an "other" group in the training of the word-embedding module 505. However, the necessary vocabulary can still be very large making it difficult to handle the size of the vocabulary. Thus, to handle the size of the vocabulary during training, the word embedding module may be pre-trained for each feature of the plurality of features present in the URL 531, to convert each word, in domain words and sub-domain words, to a smaller dimensional feature vector rather than to use a very large one-hot categorical encoding. Thus, these embedding vectors (i.e., feature vectors) are used in place of original domain/sub-domain words as processed features for the auto-encoder module 511 to work with.

The concatenated data 537 is provided to the auto-encoder module 511, where the auto-encoder module 511 uses an encoder to encode the concatenated data 537 into a latent space representation. The auto-encoder module 511 further uses decoder to reconstruct concatenated data 537 (i.e., vectorized URL 531) from the latent space representation of the concatenated data 537. Further, the reconstructed concatenated data 537 is provided to the split module 515, where the reconstructed concatenated data 537 is split into a plurality of parts, based on the plurality of features present in the reconstructed concatenated data 537. Thus, each part of the plurality of parts comprises data corresponding to each feature of the plurality of features. The plurality of parts is further provided to the classifier module 529, where it is determined whether the URL 531 comprises any anomaly or not as described with respect to FIG. 5A. In some embodiment, the proposed anomaly detector may be used to detect anomaly in video data. A detail description regarding detection of anomaly in the video data using the proposed anomaly detector is provided below with respect to FIG. 6.

Figure 6:
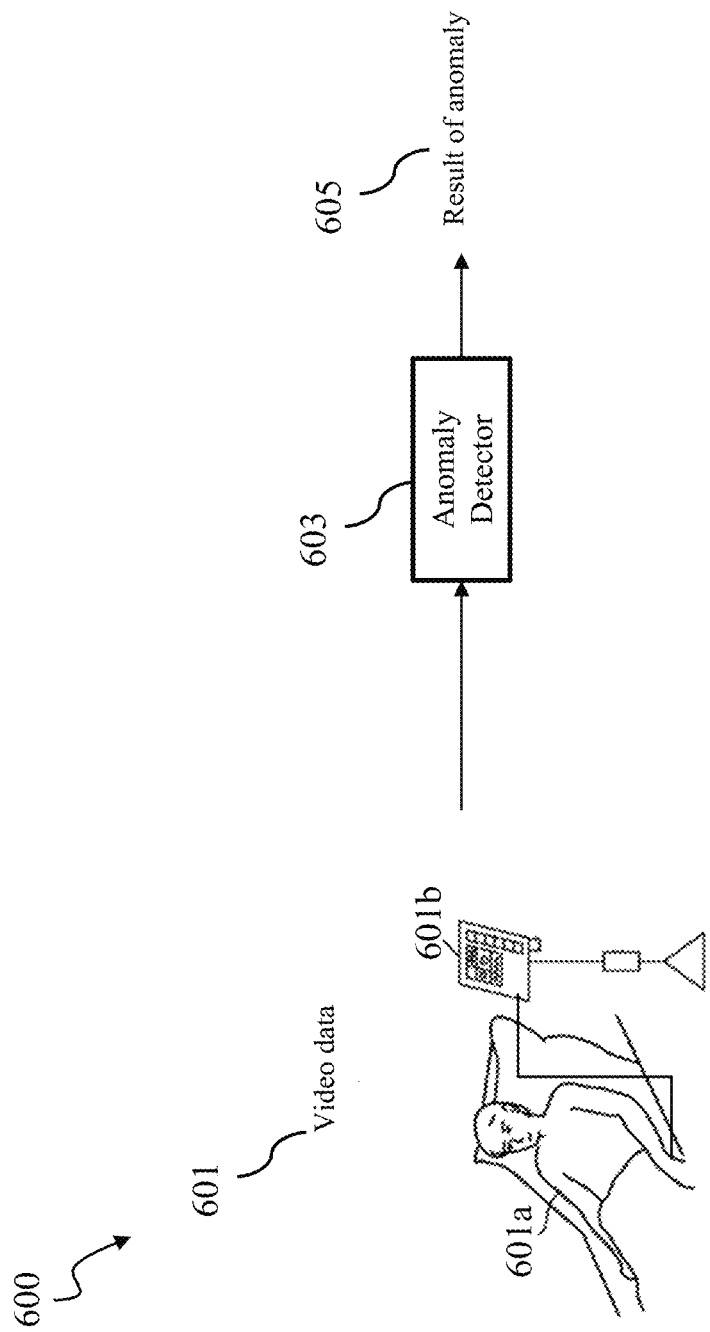
FIG. 6 is a block diagram illustrating anomaly detection in video data, in accordance with an example embodiment.

FIG. 6 is block diagram 600 illustrating anomaly detection in video data 601, in accordance with an example embodiment. The video data 601, a form of sequential data, may be real-time video and/or recorded video. In the FIG. 6, the video data 601 is of a patient 601a lying in a bed, where heartbeat of the patient 601a is being monitored using an electrocardiogram (ECG) machine 601b. The video data 601 is provided to an anomaly detector 603. The anomaly detector 603 may correspond to the anomaly detector 101. On receiving the video data 601, the anomaly detector 603 may process the video data 601. Each image frame of the video data 601 comprises different features, for example, different color channels like green, red, blue, or the likes. The plurality of features of the video data 601 may comprise preprocessed motion vectors in addition to the raw images. Further, each image frame is processed by the anomaly detector 603 using a variety of tools, like object detection, skeleton tracking, and the likes that yields a plurality of features in the video data 601 in addition to the raw pixel values.

For example, by using the object detection tools, the anomaly detector 603 can detect the ECG machine 601b in image frames and zoom in or zoom out on the ECG machine 601b in the image frames. Further, an image of an ECG graph on the ECG machine 601b may be analyzed to detect anomaly in heartbeat of the patient 601a. To that end, the anomaly detector 603 may be trained using training data comprising ECG of normal heartbeat. The anomaly detector 603, may determine reconstruction losses corresponding to the images of the ECG graph on the ECG machine 601b comprised in one or more image frames of the video data 601. The anomaly detector 603 uses an overall reconstruction loss to determine anomaly in the heartbeat of the patient 601a. Accordingly, the anomaly detector 603 may notify doctors about the detected anomaly.

In an example embodiment, the anomaly detector 603 may be used to detect anomaly in heartbeat of the patient 601b based on the image frames of the video data 601 corresponding to the ECG machine 601b. To that end, the anomaly detector 603 may be trained using training data comprising ECG of normal heart beats. Additionally or alternatively, the anomaly detector 603 may be trained to determine different features from the image frames corresponding to ECG, for example the anomaly detector 603 is trained to determine that green color (corresponding to ECG graph displayed on the ECG machine 601b) contributes to more information than other colors.

In another embodiment, the anomaly detector 603 may be used to detect anomaly in a pose (or posture) of the patient 601a. For example, the patient 601a may be in abnormal pose when the patient 601a is about to fall from the bed. Further, the abnormal pose of the patient 601a may be due to seizure attack. Thus, the anomaly detector 603 may be trained on normal poses of patients lying on the bed or doing normal activities on the bed such as eating food and the likes. The anomaly detector 603 based on the video data 601 may determine plurality of features associated with movement of the patient 601a from various image frames of the video data 601. To that end, the skeleton tracking tools may be used by the anomaly detector 603 to detect anomaly in position (or pose or posture) of the patient 601a. Also, the anomaly detector 603 may then determine overall reconstruction loss corresponding to images associated with movement of the patient 601a, and use the reconstruction loss to determine anomaly in the pose of the patient 601a. Accordingly, the anomaly detector 603 may notify doctors about the anomaly.

Exemplar Implementation

Figure 7:
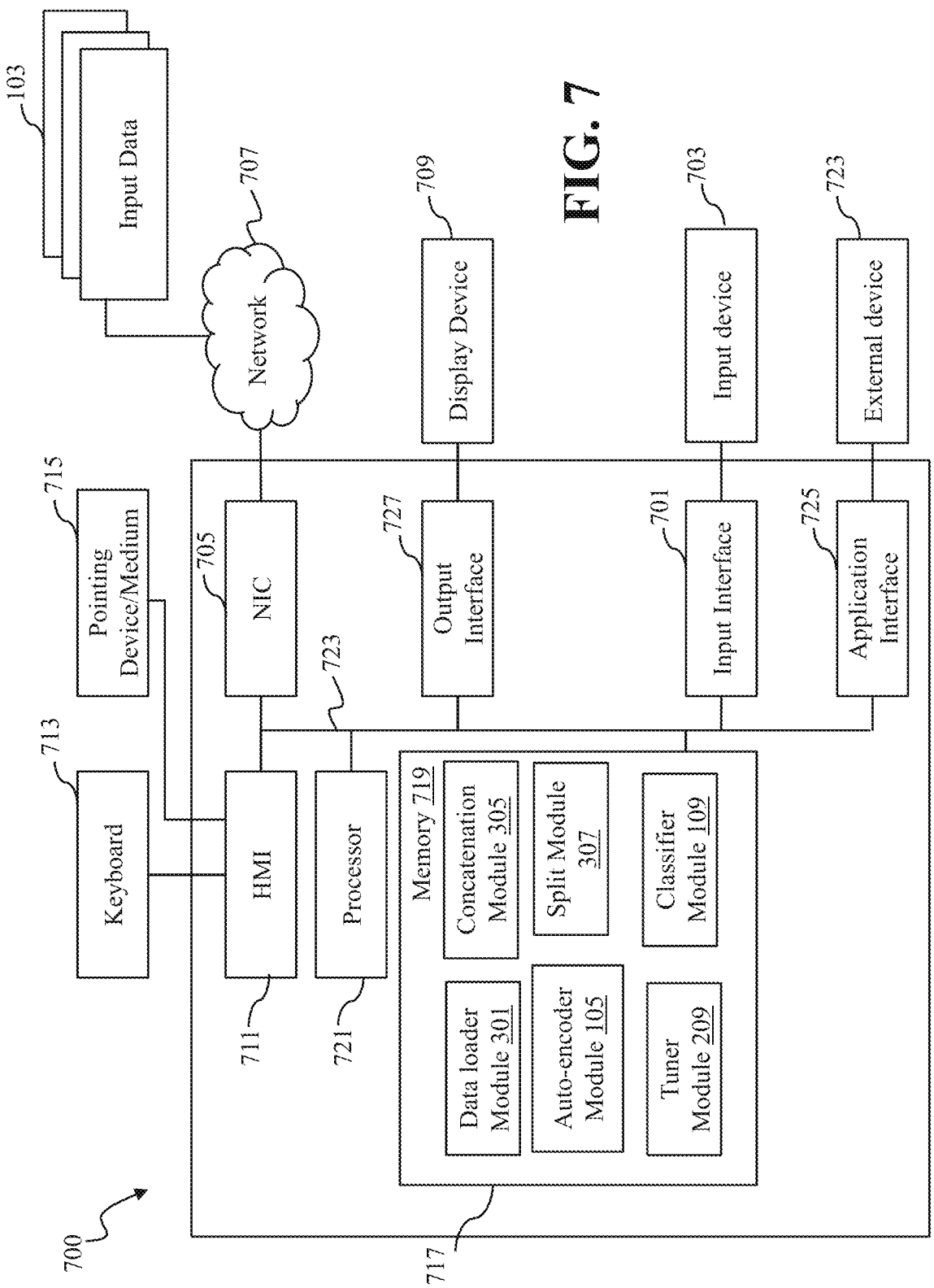
FIG. 7 illustrates a block diagram of a computer-based anomaly detector for detecting anomaly from the input data, in accordance with an example embodiment.

FIG. 7 illustrates a block diagram of a computer-based anomaly detector 700 for detecting anomaly from the input data 103, in accordance with an example embodiment. The computer-based anomaly detector 700 includes a number of interfaces connecting the anomaly detector 700 with other systems and devices. The anomaly detector 700 includes an input interface 701 configured to accept the input data 103, where the input data 103 comprises sequential data such as internet proxy data, video data, audio data, image data, or the likes.

In some embodiments, the anomaly detector 700 includes a network interface controller (NIC) 705 configured to obtain the input data 103, via network 707, which can be one or combination of wired and wireless network.

The network interface controller (NIC) 705 is adapted to connect the anomaly detector 700 through a bus 623 to the network 707 connecting the anomaly detector 700 with the input device 703. The input device 703 may correspond to a proxy log data recorder that records proxy log data to be provided to the anomaly detector 700 to detect anomaly in the recorded proxy log data. In another embodiment, the input device 703 may correspond to video recorder, where the video recorder may record video to be provided to the anomaly detector 700 to detect anomaly in the recorded video data.

Additionally, or alternatively, the anomaly detector 700 can include a human machine interface (HMI) 711. The human machine interface 711 within the anomaly detector 700 connects the anomaly detector 700 to a keyboard 713 and pointing device 715, where the pointing device 715 may include a mouse, trackball, touchpad, joy stick, pointing stick, stylus, or touchscreen, among others.

The anomaly detector 700 includes a processor 721 configured to execute stored instructions 717, as well as a memory 719 that stores instructions that are executable by the processor 721. The processor 721 can be a single core processor, a multi-core processor, a computing cluster, or any number of other configurations. The memory 719 can include random access memory (RAM), read only memory (ROM), flash memory, or any other suitable memory systems. The processor 721 may be connected through the bus 723 to one or more input and output devices.

The instructions 717 may implement a method for detecting anomaly, according to some embodiments. To that end, computer memory 719 stores the data loader module 301, the concatenation module 305, the auto-encoder module 105, the split module 307, the classifier module 109, and the tuner module 209. In order to determine anomaly in the input data 103, initially the input data 103 is partitioned by the data loader module 301 into a plurality of parts based on a plurality of features present in the input data. The data loader module 301 further vectorizes each part of the plurality of parts of the input data 103, where vectorized part comprises numerical representation of data in the corresponding part.

Further, the vectorized data is provided to the concatenation module 305 to concatenate plurality of vectorized parts and generate concatenated data. The concatenated data is provided to the auto-encoder module 105, where the concatenated data is compressed and decompressed to reconstruct the concatenated data. The reconstructed data comprises reconstruction loss, where the reconstruction loss is difference between original input data to the auto-encoder module 105 and the input data reconstructed by the auto-encoder module 105.

The anomaly detector 700 can accurately detect anomaly from the input data 103 and further determine which feature of the input data 103 is anomalous. To that end, anomaly detector 700 is configured to analyze input data 103 corresponding to each feature individually. This is achieved using the split module 307 that divides the reconstructed data into a plurality of parts based on the plurality of features in the reconstructed data. Further, the data corresponding to each feature is provided to the classifier module 109. The classifier module 109 is configured to determine loss functions corresponding to each part to accurately determine individual reconstruction loss. The classifier module 109 is further configured to determine overall reconstruction loss as weighted combination of individual reconstruction loss. The overall reconstruction loss is then compared with a threshold. When the overall reconstruction loss is more than the threshold reconstruction, the classifier module 109 determines that the input data 103 comprises anomaly. The user may be notified regarding the anomaly and the feature of the input data comprising the anomaly in order to enable the user to further investigate the detected anomaly.

Based on the result of the anomaly detection provided by the classifier module 109, the user may provide feedback to the classifier module 109. The user feedback may comprise labeled information associated with misclassification of the input data as anomalous or vice-a-versa. The labeled data in the user feedback is used by the tuner module 209 to tune or adjust the threshold and weights used for the individual reconstruction loss such that modified results of the anomaly detector 700 is in line with the label (anomalous or non-anomalous) corresponding to the input data 103 provided by user feedback.

In some embodiments, an output interface 727 may be configured to render the result of anomaly detection on a display device 709. Examples of a display device 709 include a computer monitor, television, projector, or mobile device, among others. The computer-based anomaly detector 700 can also be connected to an application interface 725 adapted to connect the computer-based anomaly detector 700 to an external device 723 for performing various tasks.

EMBODIMENTS

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Further, embodiments of the present disclosure and the functional operations described in this specification can be implemented in digital electronic circuitry, in tangibly-embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. An anomaly detector, comprising:
an input interface configured to accept input data comprising a plurality of features;
a memory configured to store instructions thereon;
at least one processor configured to execute the instructions to:
  execute an autoencoder including an encoder trained to encode the accepted input data and a decoder trained to decode the encoded input data to reconstruct the accepted input data;
  split the reconstructed input data into a plurality of parts based on the plurality of features present in the reconstructed input data;
  determine a collective reconstruction loss indicative of a difference between the accepted input data and the reconstructed input data, wherein the collective reconstruction loss includes a weighted combination of a plurality of loss functions evaluating reconstruction losses of the plurality of parts of the reconstructed input data, different types of loss functions, or both wherein to determine the reconstruction loss the processor is further configured to:
    determine a loss function of the plurality of loss functions that is appropriate to calculate loss for each part of the plurality of parts of the reconstructed input data; and
    calculate an individual reconstruction loss corresponding to each part of the plurality of parts of the reconstructed input data, based on the determined loss function; and
  detect an anomaly in the reconstructed input data when the collective reconstruction loss is above a threshold; and
an output interface configured to render a result of the anomaly detection.

2. The anomaly detector of claim 1, wherein the input interface is further configured to accept a user input based on the result of the anomaly detection, and wherein the user input includes a label indicating whether the accepted input data is anomalous or not.

3. The anomaly detector of claim 2, wherein the at least one processor is further configured to update, in response to the accepted user input, at least one of: the threshold and weight of at least one loss function of the plurality of loss functions in the weighted combination to adjust the collective reconstruction loss such that the result of anomaly detection is aligned with the label.

4. The anomaly detector of claim 1, wherein the input interface is further configured to accept a user input based on the result of the anomaly detection, and wherein the user input includes a label indicating a misclassification of the accepted input data.

5. The anomaly detector of claim 4, wherein the at least one processor is further configured to update, in response to the accepted user input, at least one of: the threshold and weight of at least one loss function of the plurality of loss functions in the weighted combination to correct the misclassification of the accepted input data.

6. The anomaly detector of claim 1, wherein the at least one processor is further configured to:
partition the accepted input data into a plurality of parts based on the plurality of features of the accepted input data; and
vectorize each part of the plurality of parts of the accepted input data.

7. The anomaly detector of claim 6, wherein the at least one processor is further configured to:
obtain a plurality of vectorized parts of the accepted input data; and
concatenate the plurality of vectorized parts of the accepted input data to form concatenated data, wherein the autoencoder reconstructs the accepted input data by processing the concatenated data.

8. The anomaly detector of claim 1, wherein the processor is further configured to:
assign a weight to each loss function of the plurality of loss functions; and
determine the weighted combination of the plurality of loss functions associated with the plurality of parts of the reconstructed input data.

9. The anomaly detector of claim 1, wherein the accepted input data corresponds to internet proxy log data.

10. The anomaly detector of claim 9,
wherein the at least one processor is further configured to partition the internet proxy log data into a plurality of parts based on a plurality of features of the internet proxy log data,
wherein the plurality of features of the internet proxy log data comprises embedded features, categorical features, and numerical features, and
wherein the at least one processor is further configured to vectorize each part of the plurality of parts of the internet proxy log data.

11. The anomaly detector of claim 10, wherein the at least one processor is further configured to:
vectorize the plurality of parts corresponding to the embedded features, and
vectorize the plurality of parts corresponding to the categorical features.

12. The anomaly detector of claim 10, wherein the at least one processor is further configured to obtain a plurality of vectorized parts to concatenate the plurality of vectorized parts to form concatenated data, and
wherein the autoencoder is further configured to reconstruct the internet proxy log data by processing the concatenated data.

13. The anomaly detector of claim 12, wherein the at least one processor is further configured to:
receive the reconstructed internet proxy data from the autoencoder; and
split the reconstructed internet proxy data into a first part, a second part, and a third part based on a plurality of features of the reconstructed internet proxy log data, wherein the first part corresponds to the embedded feature, the second part corresponds to the categorical feature, and the third part corresponds to the numerical feature.

14. The anomaly detector of claim 13, wherein the at least one processor is further configured to:
receive the first part, the second part, and the third part of the reconstructed input data; and
calculate:
cross-entropy loss corresponding to the first part with respect to original embedded features,
cross-entropy loss corresponding to the second part with respect to the original categorical features, and
a mean square error loss corresponding to the third part.

15. The anomaly detector of claim 14, wherein the at least one processor is further configured to:
assign a weight to each loss function corresponding to each part of the reconstructed internet proxy data; and
determine the weighted combination of the plurality of loss functions associated with each part of the reconstructed internet proxy data.

16. The anomaly detector of claim 1, wherein the accepted input data represents an operation of a system, and wherein the at least one processor is further configured to control the system based on the result of the anomaly detection.

17. A method for anomaly detection, wherein the method uses a processor coupled with stored instructions implementing the method, the method comprising:
receiving input data comprising a plurality of features;
encoding the received input data and decoding the encoded input data to reconstruct the received input data using a neural network having an autoencoder architecture;
splitting the reconstructed input data into a plurality of parts based on the plurality of features present in the reconstructed input data;
determining a collective reconstruction loss indicative of a difference between the accepted input data and the reconstructed input data, wherein the collective reconstruction loss includes a weighted combination of a plurality of loss functions evaluating reconstruction losses of the plurality of parts of the reconstructed input data, different types of loss functions, or both, wherein determining the reconstruction loss comprises:
determining a loss function of the plurality of loss functions that is appropriate to calculate loss for each part of the plurality of parts of the reconstructed input data; and
calculating an individual reconstruction loss corresponding to each part of the plurality of parts of the reconstructed input data, based on the determined loss function;

detecting an anomaly in the reconstructed input data when the collective reconstruction loss is above a threshold; and rendering a result of the anomaly detection.

18. A non-transitory computer readable storage medium embodied thereon a program executable by a processor for performing a method, the method comprising:

receiving input data comprising a plurality of features;

encoding the received input data and decoding the encoded input data to reconstruct the received input data using a neural network having an autoencoder architecture;

splitting the reconstructed input data into a plurality of parts based on the plurality of features present in the reconstructed input data;

determining a collective reconstruction loss indicative of a difference between the accepted input data and the reconstructed input data, wherein the collective reconstruction loss includes a weighted combination of a plurality of loss functions evaluating reconstruction losses of the plurality of parts of the reconstructed input data, different types of loss functions, or both, wherein determining the reconstruction loss comprises:

determining a loss function of the plurality of loss functions that is appropriate to calculate loss for each part of the plurality of parts of the reconstructed input data; and calculating an individual reconstruction loss corresponding to each part of the plurality of parts of the reconstructed input data, based on the determined loss function;

detecting an anomaly in the reconstructed input data when the collective reconstruction loss is above a threshold; and rendering a result of the anomaly detection.

\* \* \* \* \*